United States Patent [19]

Rickelton et al.

[11] Patent Number: 5,759,512
[45] Date of Patent: Jun. 2, 1998

[54] REGENERATION OF DITHIOPHOSPHORUS ACID METAL EXTRACTANTS

[75] Inventors: William Andrew Rickelton, Niagara Falls; Indje Ognianov Mihaylov, Mississauga; Bruce John Love, Georgetown; Pak Kuen Louie, Weston; Eberhard Krause, Oakville, all of Canada

[73] Assignees: Cytec Technology Corp., Wilmington, Del.; Inco Limited, Toronto, Canada

[21] Appl. No.: 658,196

[22] Filed: Jun. 4, 1996

[51] Int. Cl.[6] .............................. B01D 11/04; C07F 9/02
[52] U.S. Cl. .................... 423/658.5; 423/99; 423/139; 568/14
[58] Field of Search .................. 568/14; 423/139, 423/24, 99, 658.5

[56] References Cited

U.S. PATENT DOCUMENTS

| | | | |
|---|---|---|---|
| 3,336,133 | 8/1967 | Funatsu et al. | 75/119 |
| 4,664,700 | 5/1987 | Alexandratos | 210/688 |
| 4,721,605 | 1/1988 | Brown et al. | 423/24 |
| 4,842,844 | 6/1989 | Harris et al. | 423/657 |
| 4,956,154 | 9/1990 | Magdics et al. | 423/140 |
| 5,078,900 | 1/1992 | Wegner | 210/728 |
| 5,332,531 | 7/1994 | Horwitz et al. | 423/140 |
| 5,447,552 | 9/1995 | Mihaylov et al. | 75/722 |
| 5,510,201 | 4/1996 | Werth | 423/657 |
| 5,587,142 | 12/1996 | Horwitz et al. | 423/21.1 |

FOREIGN PATENT DOCUMENTS 82107216  1/1994  Taiwan.

OTHER PUBLICATIONS

Saul Patai, "The chemistry of the thiol group, Part 1", (1974) pp. 220-229.
"Advanced Organic Chemistry, Third Edition," J. Wiley & Sons, (1985) pp. 1110.
Cote et al., "Metal Complexes with Organothiophosphorus Ligands and Extraction Phenomena," Reviews in Inorganic Chemistry, Complexes with Organothiophosphorus Ligands, vol. 10, Nos. 1–3, (1989) pp. 121–144.
W.A. Rickelton, "Novel Uses for Thiophosphinic Acids in Solvent Extraction," JOM (May 1992) pp. 52–54.
Sole et al., "Solvent extraction characteristics of thiosubstituted organophosphinic acid extractants," Hydrometallurgy 30 (1992) pp. 345–365.

*Primary Examiner*—Wayne Langel
*Attorney, Agent, or Firm*—Blake T. Biederman; Edward A. Steen

[57] ABSTRACT

The invention provides a method of regenerating dithiophosphorus extractants such as dithiophosphoric acids, dithiophosphonic acids and dithiophosphinic acids from their sulfur-sulfur bonded oxidation products contained in an organic solution. The process generates active hydrogen for regenerating the spent dithiophosphorus extractants. Advantageously, this active hydrogen originates either from introducing a reactive metal into a liquid mixture containing the organic solution and an acidic aqueous solution to form nascent hydrogen or from using hydrogen gas in the presence of a catalyst in the organic solution. The active hydrogen generated in the process breaks the sulfur-sulfur bonds of the dithiophosphorus molecules to form the corresponding dithiophosphorus acids.

20 Claims, 1 Drawing Sheet

REGENERATION OF DITHIOPHOSPHORUS ACID METAL EXTRACTANTS

FIELD OF INVENTION

This invention is related to a process for regenerating organic dithiophosphorus acids. Specifically, this invention relates to a process for regenerating dithiophosphoric, dithiophosphonic and dithiophosphinic acid extractants from their sulfur-sulfur bonded oxidation products.

BACKGROUND OF THE INVENTION

Brown et al., in U.S. Pat. No. 4,721,605, disclose the use of dithiophosphinic acid extractant for solvent extraction separation of cadmium, cobalt, copper, mercury, nickel, silver and zinc metal ions from calcium and magnesium metal ions. Recently, it has been discovered that the dithiophosphinic acid of Brown et al., may be specifically adapted to selectively extract nickel and cobalt. Mihaylov et al., in U.S. Pat. No. 5,447,552, disclose a method of selectively extracting nickel and cobalt from acidic leach solutions with dithiophosphinic acid extractants. However, during extended experimental testing of the method, it was observed that the extraction capacity slowly decreased as a function of time.

An investigation of this phenomenon indicated that the extractant was being converted to an end product having significantly reduced nickel and cobalt extraction capacity. Specific testing revealed that the metal loading capacity loss was caused by the oxidation of the dithiophosphinic acid. Two dithiophosphinic acid molecules combine to produce a sulphur-sulphur bonded oxidation product (compound II) as shown below.

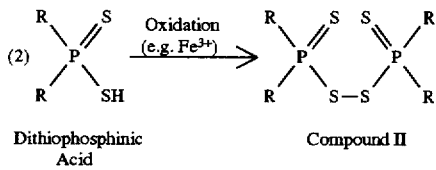

Dithiophosphinic Acid      Compound II

The above oxidation product (compound II) has significantly reduced metal-extractive properties. For purposes of the specification and claims, compound II means the above-illustrated sulfur-sulfur bonded oxidation product of dithiophosphinic acid.

Oxidizing species, such as $Fe(III)$, $Co(III)$ and $O_2$, were all found to initiate or accelerate the oxidation of dithiophosphinic acid to compound II. For example, relatively small (20–50 mg/L) concentrations of ferric iron (Fe III) present in the aqueous feed were found to cause significant oxidation of the extractant. Even low ferric levels of <2 mg/L were found to cause slight reductions in extractant concentration over extended periods of time. Also, some oxidation was observed when the extractant was stored in contact with aqueous solutions, containing some or all of the above oxidizing species.

An irreversible loss of reagent extraction capacity has drastic consequences on the economic feasibility of commercially operating the dithiophosphinic acid solvent extraction process. The extractant must be successfully cycled many times without a significant loss in metal loading capacity to provide a commercially viable solvent extraction process. Mihaylov et al., in U.S. Pat. No. 5,447,552, have further disclosed that the oxidation rate of dithiophosphinic acid may be controlled to commercially acceptable rates by limiting interaction of the extractant with $Fe(III)$, $Co(III)$, $O_2$ and other oxidizing species. However, an inexpensive method for regenerating the extractant would further aid the commercial implementation of solvent extraction processes based on dithiophosphinic acid extractants.

In addition to dithiophosphinic acid, other dithiophosphorus acids such as dithiophosphoric acids and dithiophosphonic acids are believed to degrade to sulfur-sulfur bonded oxidation products. The oxidation product formed depends upon the exact dithiophosphorus acid used. The dithiophosphorus acids of the specification and claims are represented by, but are not limited to, the following formulas:

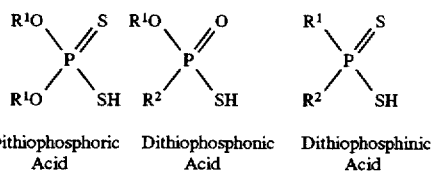

Dithiophosphoric Acid   Dithiophosphonic Acid   Dithiophosphinic Acid wherein $R^1$ and $R^2$ are the same or different and are selected from the group consisting of substituted alkyl, cycloalkyl, alkoxyalkyl, alkylcycloalkyl, aryl, alkylaryl, aralkyl and cycloalkylaryl radicals having from about 2 to 24 carbon atoms.

Solvent extraction processes that incorporate a step to regenerate an extractant are rare. The only known solvent extraction plant to regenerate its extractant uses an oxime type extractant for extracting nickel from ammoniacal solutions. This oxime extractant decomposes into an organic-soluble ketone. Since this ketone product has the same structure as the ketone used for synthesizing the oxime extractant, this solvent extraction plant periodically reacts the ketone with a hydroxylamine salt in situ to regenerate the oxime extractant. But as far as known, no process for the in situ regeneration of a dimerized, organophosphorus extractant has been published or commercially implemented.

It is an object of the invention to provide a method of regenerating dithiophosphorus acid extractants from their sulfur-sulfur bonded oxidation products.

It is a further object of this invention to provide a method of regenerating dithiophosphorus acid extractants with reagents that are compatible with solvent extraction processes.

It is a further object of this invention to regenerate dithiophosphorus acid extractants in a method that minimizes the generation of by-products, such as the corresponding monothiophosphorus acids.

SUMMARY OF THE INVENTION

The invention provides a method of regenerating dithiophosphorus extractants such as dithiophosphoric acids, dithiophosphonic acids and dithiophosphinic acids from their sulfur-sulfur bonded oxidation products contained in an organic solution. The process generates active hydrogen for regenerating the spent dithiophosphorus extractants. Advantageously, this active hydrogen originates either from introducing a reactive metal into a liquid mixture containing the organic solution and an acidic aqueous solution to form nascent hydrogen or from using hydrogen gas in the presence of a catalyst in the organic solution. The active hydrogen generated in the process breaks the sulfur-sulfur bonds of the dithiophosphorus molecules to form the corresponding dithiophosphorus acids.

DESCRIPTION OF PREFERRED EMBODIMENT

Figure 1:
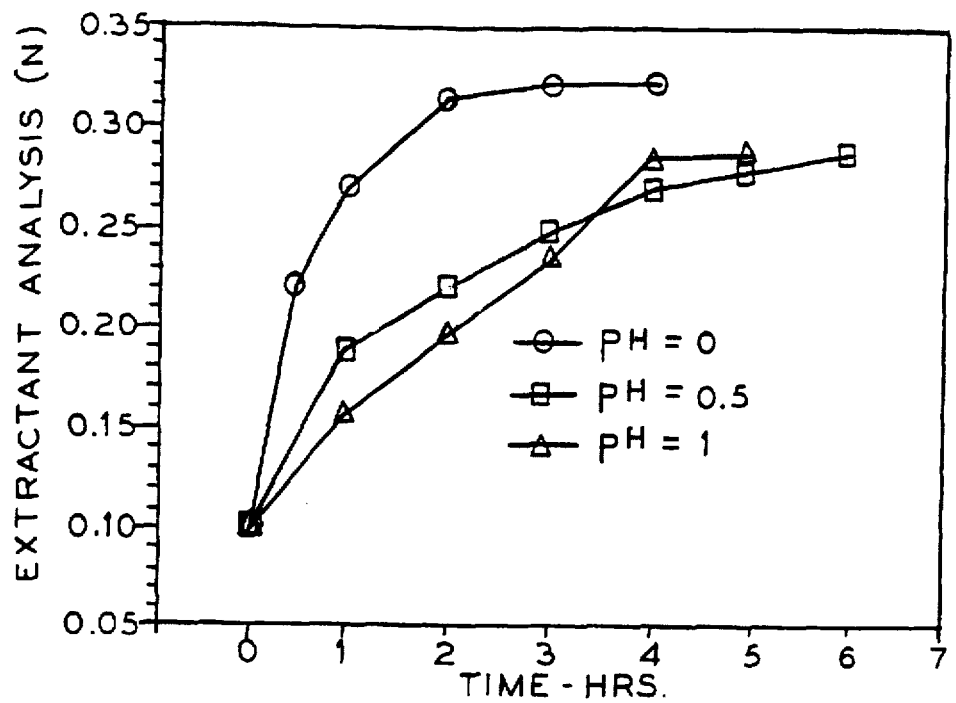
FIG. 1, is a graph of the effect of pH on the rate of regeneration of a dithiophosphinic acid extractant using metallic zinc powder in $H_2SO_4$ at 60° C.

It has been discovered that the dimerized oxidation product of dithiophosphorus acids may be readily converted back to the dithiophosphorus acid extractants in the presence of active hydrogen. For purposes of the specification and claims, "active hydrogen" means nascent or atomic hydrogen or any other form of hydrogen that promotes the cleaving of dimerized dithiophosphorus acid extractants. Preferably active hydrogen originates from the reaction of a reactive metal with a mineral acid or hydrogen in the presence of a catalyst. For purposes of the specification and claims, reactive metal means any metallic substance that, suspended in an acidic aqueous solution, reacts to produce active hydrogen. Specifically, it has been discovered that the oxidized dithiophosphoric, dithiophosphonic and dithiophosphinic acid extractants may be regenerated using active hydrogen.

This regeneration can be achieved in either a batch or continuous mode of operation. To initiate regeneration of the dithiophosphorus acid, the organic solution containing spent extractant is fed into a regeneration vessel. Advantageously, a liquid mixture of organic solution containing spent extractant and aqueous solution containing a mineral acid is continuously mixed or stirred. Since dithiophosphorus extractants have extremely low solubilities in the aqueous solution, the two liquids are mixed sufficiently to increase contact between the organic phase containing a sulfur-sulfur bonded compound and the aqueous solution to accelerate reaction kinetics. Most advantageously, the stirring converts the liquid mixture into an emulsion. A reactive metal is either added with the aqueous solution or added to the liquid mixture before, during or after stirring to provide a source of active hydrogen by the acidic dissolution of the reactive metal. Most advantageously, the reactive metal is added as a powder to provide a high surface area to optimize generating of nascent hydrogen. The spent extractant interacts with the nascent hydrogen formed by dissolution of the reactive metal to cleave the sulfur-sulfur bonded and produce the corresponding dithiophosphorus acids.

Alternately, the source of active hydrogen may originate from hydrogen gas in the presence of a catalyst, electrolytic generation of hydrogen or any other process for generating nascent (atomic) hydrogen. Catalysts, such as platinum group catalysts, interact with hydrogen gas to generate active hydrogen directly in the organic phase without an aqueous phase. Optionally, this active hydrogen generated with a catalyst can regenerate dithiophosphorus acids in a liquid mixture containing acidic aqueous solution and organic phase.

During regenerating, the sulfur-sulfur bond of the spent dithiophosphorus extractant is initially broken to form two dithiophosphorus acid molecules for each molecule of spent extractant divided. The resulting dithiophosphorus acid may react with metal ions such as zinc, iron or nickel present in the aqueous solution, to form metal-organodithiophosphorus compounds.

After regenerating, the dithiophosphorus compound formed is advantageously returned to a solvent extraction circuit. The dithiophosphorus compound is either returned directly or, if preferred, converted to an acid form in the solvent extraction circuit by acid stripping.

The process of the invention has been found to be effective with different sources of active hydrogen. Specific systems suitable for producing active hydrogen include zinc metal in sulfuric acid or hydrochloric acid, nickel metal in hydrochloric acid, iron metal in sulfuric acid and gaseous hydrogen with a platinum group metal supported catalyst.

Advantageously, the pH of the solution is maintained at a level below at least about 3 during the breaking of the sulfur-sulfur bonds of spent extractant with nascent hydrogen. Most advantageously, the pH of the solution is maintained at a level below at least about 2. Advantageously, the temperature of the aqueous/organic phase mixture is maintained at a level of at least about 40° C. to accelerate the kinetics of the reaction. Most advantageously, temperature of the aqueous/organic mixture is maintained at a level of at least about 50° C. to further accelerate the regeneration.

EXAMPLES

The following examples use organic solution in which approximately two thirds of the originally present dithiophosphinic acid extractant had oxidized to compound II (organic solution I). Specifically, the organic solution I formed as the result of repeated solvent extraction (SX) of nickel and cobalt using Cyanex 301 extractant. (Cyanex is a registered trademark for organophosphorus extractants distributed by Cytec Canada Inc.) Cyanex 301 extractant contains 85% (by weight) of bis (2, 4, 4-trimethylpentyl) dithiophosphinic acid.

Prior to use in the nickel/cobalt SX process, the organic dithiophosphinic acid extractant solution was prepared by adding 15% by volume dithiophosphinic acid (Cyanex 301 extractant) to an aliphatic diluent (Isopar M—Isopar M is a trade designation for an aliphatic hydrocarbon sold by ESSO). Thus, the expected concentration of dithiophosphinic acid in the extractant is 0.33 mol/L. Small amounts of monothiophosphinic acid are typically present in the extractant solution in the ranges of 0.01 to 0.05 mol/L.

The composition of the extractant is examined using titration, phosphorus 31) nuclear magnetic resonance spectroscopy (NMR) and/or gas chromatography-mass spectrometry (GC-MS). The three analytical methods complement each other, such that proper analysis of the results from each allows for qualitative and quantitative identification of the various chemical species present in the extractant.

Five liters of organic solution I are stripped using 6N HCl for four hours at a temperature of 50° to 60° C. and washed with water. The 6N HCl stripping and water washing cycles are then repeated. The stripped organic (organic solution II) is analyzed by titration, yielding a dithiophosphinic acid concentration of 0.10 mol/L.

Small amounts of this organic solution (100–500 mL) are used for each of the following Examples. The reaction apparatus used to carry out testing of various reagents consists of 250 mL reaction beakers with closed tops equipped with pH and Eh measurement, temperature control and means for stirring. During the course of each experiment, 10 mL samples are withdrawn at various time intervals. These samples are stripped using 6N HCl and washed with water. The stripping and washing cycles are then repeated. Stripped and washed samples are then analyzed for dithiophosphinic acid and monothiophosphinic acid by successive titration.

Example 1

In this example, a portion of the organic solution II is added to a sulfuric acid solution having an initial pH of 1.0. Zn powder is added to the mixture. Stirring is used and the temperature is maintained at 60° C. Additional increments of zinc powder and acid are added, in order to maintain hydrogen gas formation. The mixture is continuously stirred overnight. The metal loading capacities of the organic solution before and after the treatment outlined above are 3.7 and 8.1 g of Ni/L respectively. The 4.4 g of Ni/L increase in loading capacity successfully illustrates the use of zinc metal and sulfuric acid to regenerate dithiophosphinic acid.

Example 2

In this example, zinc metal in a sulfuric acid solution is used to regenerate dithiophosphinic acid from solutions containing organic solution II under various pH conditions. Reagent grade Zn powder is screened and found to have the following size distribution by weight: 5.8% +100 mesh (+150 μm), 81.4% −100/+400 mesh (+38/−150 μm) and 12.8% −400 mesh (−38 μm). The extractant (usually 250 mL) is added to water in the ratio of 1:1. The mixture is heated to a temperature of 60° C. and the pH is adjusted with the addition of $H_2SO_4$. A weighed amount of Zn powder (usually 100 grams) is then added, and the pH is maintained during the dissolution of the Zn powder by automatic control of acid addition. Constant stirring is maintained throughout the regeneration of dithiophosphinic acid at a pH of 0.0, 0.5 and 1.0. FIG. 1 illustrates that a pH of 0 is the most effective for regenerating dithiophosphinic acid.

Example 3

Figure 2:
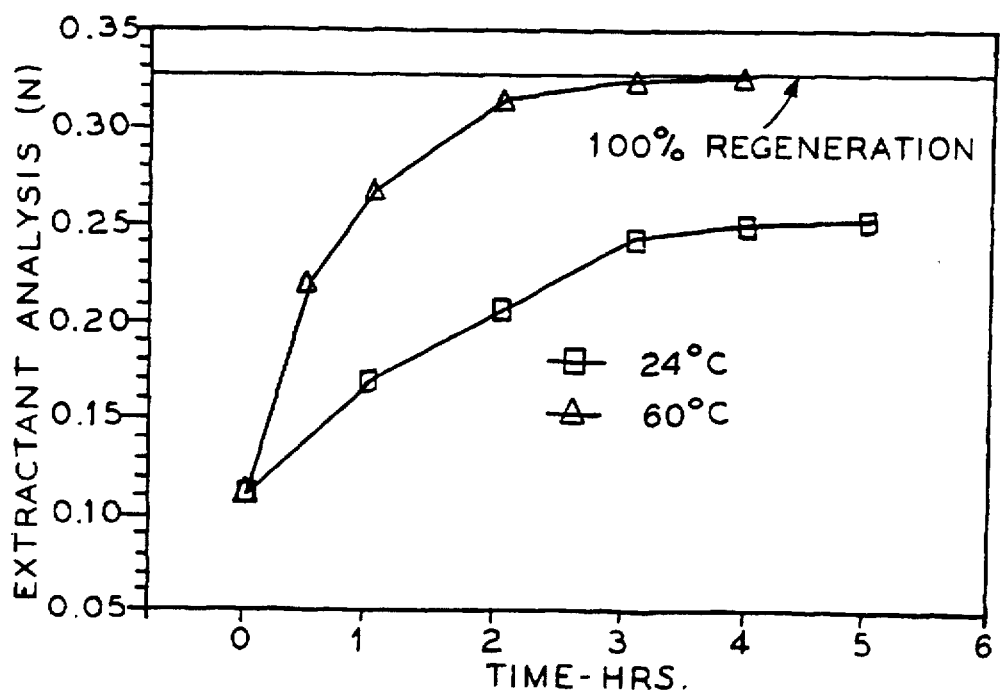
FIG. 2. is a graph of the effect of temperature on the rate of regeneration of a dithiophosphinic acid extractant using metallic zinc powder in $H_2SO_4$ at a pH of 0.

In Example 3, the conditions of Example 2 are repeated, except that testing is performed at a pH of 0 and at temperatures of 24° C. and 60° C. Referring to FIG. 2, increasing temperature from 24° C. to 60° C. dramatically increase the rate of regeneration at a pH of 0 for the $Zn/H_2SO_4$ system. This example illustrates the significant effect of temperature on the regeneration rates.

Example 4

In this example, cycling tests are performed in order to determine whether or not repeated regeneration/degradation of the dithiophosphinic acid extractant will have any detrimental effects upon the extractant. For this experiment, a 500 mL sample of organic solution II is subjected to a series of oxidation/reduction cycles. The extractant is oxidized using 2g/L $Fe^{3+}$, pH 1.5, 60° C., organic to aqueous (A/O) =1, air flow=10 mL/min and 16 h contact. The resulting organic phase is stripped several times, and water washed, prior to chemical analysis by titration to determine its dithiophosphinic acid concentration.

The organic phase is then regenerated by using the following conditions: 100 g Zn powder/L of organic, O/A=1, 4h, pH=0 using sulfuric acid, temperature 60° C. Following the regeneration, the sample is again stripped, washed and analyzed prior to the next cycle. Six such cycles are carried out over the course of several weeks. Table 1 below provides the titration analysis in moles per liter of the samples taken after each regeneration (reduction) and degradation (oxidation) of the dithiophosphinic acid reagent.

TABLE 1

| SAMPLE # | | DITHIOPHOSPHINIC ACID | MONOTHIOPHOSPHINIC ACID |
|---|---|---|---|
| 1R | 1 | 0.370 | 0.023 |
| 1D | 2 | 0.069 | 0.025 |

TABLE 1-continued

| SAMPLE # | | DITHIOPHOSPHINIC ACID | MONOTHIOPHOSPHINIC ACID |
|---|---|---|---|
| 2R | 3 | 0.370 | 0.027 |
| 2D | 4 | 0.062 | 0.029 |
| 3R | 5 | 0.356 | 0.030 |
| 3D | 6 | 0.012 | 0.030 |
| 4R | 7 | 0.359 | 0.034 |
| 4D | 8 | 0.109 | 0.036 |
| 5R | 9 | 0.369 | 0.038 |
| 5D | 10 | 0.010 | 0.052 |
| 6R | 11 | 0.350 | 0.052 |

D = Degradation
R = Regeneration

The results illustrated in Table 1 confirm that dithiophosphinic acid may be repeatedly regenerated with minimal production of monothiophosphinic acid.

Example 5

In this example, nickel metal powder (INCO 123) in a hydrochloric acid solution is used to regenerate dithiophosphinic acid extractant. An addition of 100 grams of nickel is added for each liter of organic solution II. The aqueous solution contains 2.0N HCl and is maintained at a temperature of 60° C. The nickel-containing solution is constantly stirred. Samples of the treated organic are taken at various time intervals and analyzed for dithiophosphinic acid, as shown in Table 2.

TABLE 2

| TIME (hours) | Dithiophosphinic Acid (mol/L) |
|---|---|
| 0.0 | 0.120 |
| 0.5 | 0.125 |
| 1.0 | 0.137 |
| 2.0 | 0.149 |
| 3.0 | 0.161 |
| 4.0 | 0.173 |
| 5.0 | 0.186 |

Example 6

This example illustrates the effectiveness of using iron and sulfuric acid to regenerate dithiophosphinic acid extractant. First, metallic iron is tested using 100 g Fe/L (Domfer MP81) and $H_2SO_4$ that are added to a 1:1 aqueous to organic solution II mixture. The pH is controlled the temperature is maintained at 60° C. The organic phase is sampled each hour and titrated. The results from the Fe powder/$H_2SO_4$ test are shown in Table 3 below.

TABLE 3

| Time (hours) | Dithiophosphinic Acid (mol/L) |
|---|---|
| 0 | 0.120 |
| 1 | 0.276 |
| 2 | 0.247 |
| 3 | 0.247 |

Example 7

Catalytic reduction of compound II using hydrogen gas and a platinum group metal catalyst is also demonstrated.

The experiments are conducted in a one liter stainless steel autoclave. The catalyst material used is a 5% reduced Pd on a carbon support. The initial conditions used are 60° C., 200 psi (1.4 KPa) $H_2$, for four hours. No regeneration is observed under these conditions. A second test is conducted at 70° C. and a pressure of 400 psi (2.8 KPa)$H_2$. Some (16%) regeneration is observed during the second test; and the results are shown in Table 4 in moles per liter.

TABLE 4

| Time (hours) | Dithiophosphinic Acid |
|---|---|
| 0 | 0.100 |
| 1 | 0.116 |
| 3 | 0.126 |
| 5 | 0.141 |

From the test results of Table 4, it is expected that higher temperature, $H_2$ gas pressure and/or longer reaction times will increase the respective amounts of dithiophosphinic acid regenerated.

The regeneration of dithiophosphinic acid from nickel/HCl and Fe/$H_2SO_4$ solutions diminish in effectiveness after several hours of regeneration. For this reason, it may be advantageous to limit the regeneration time to maximize the rapid regeneration of dithiophosphinic acid.

Initial testing with aluminum in sulfuric acid, sodium borohydride (NaBH$_4$) and lithium aluminum hydride (LiAlH$_4$) were not found to regenerate dithiophosphinic acid at commercially acceptable rates. However, it is likely that these processes may be optimized to produce improved results.

The invention provides a commercially viable method of regenerating dithiophosphorus acid extractants from their spent oxidation products. The dithiophosphorus acid is ideally regenerated with metals and mineral acids that are compatible with solvent extraction of cobalt, nickel, zinc or other metals. Most advantageously, a combination of zinc and sulfuric acid are used to regenerate the dithiophosphorus acid. In addition, the process of the invention produces only a negligible amount of monothiophosphinic acid during regeneration of dithiophosphinic acid. In summary, the process of the invention may be used to greatly extend the useful operating life of dithiophosphorus acid extractants and to dramatically lower the operating costs of solvent extraction processes using such extractants.

In accordance with the provisions of the statute, the specification illustrates and describes specific embodiments of the invention. Those skilled in the art will understand that changes may be made in the form of the invention covered by the claims; and that certain features of the invention may sometimes be used to advantage without a corresponding use of the other features.

The embodiments of the invention in which an exclusive property or privilege is claimed are defined as follows:

1. A method of regenerating spent extractants comprising the steps of:
    a) providing an organic solution containing spent dithiophosphorus extractant, said spent dithiophosphorus extractant having been formed by oxidation and sulfur-sulfur bonding of extractant molecules selected from the group consisting of a dithiophosphoric acid, a dithiophosphonic acid and a dithiophosphinic acid,
    b) generating active hydrogen for use with said spent dithiophosphorus extractant, and
    c) breaking said sulfur-sulfur bonds of said dithiophosphorus extractant with said active hydrogen to form the corresponding dithiophosphorus acid.

2. The method of claim 1 wherein said generating of said active hydrogen includes providing a reactive metal in a liquid mixture of acidic aqueous solution and said organic solution to react said reactive metal with said acidic aqueous solution of said liquid mixture to form nascent hydrogen.

3. The method of claim 2 including the additional step of mixing said reactive metal in said liquid mixture; and wherein said reactive metal is selected from the group consisting of iron, nickel and zinc.

4. The method of claim 3 wherein said reactive metal dissolves in a mineral acid to form said nascent hydrogen.

5. The method of claim 4 wherein said liquid mixture is maintained at a temperature of at least about 40° C. and a pH below at least about 3.

6. The method of claim 3 wherein dissolution of zinc metal in sulfuric acid solution forms said nascent hydrogen.

7. The method of claim 3 wherein dissolution of zinc metal in hydrochloric acid solution forms said nascent hydrogen.

8. The method of claim 3 wherein dissolution of nickel metal in hydrochloric acid solution forms said nascent hydrogen.

9. The method of claim 3 wherein dissolution of iron metal in sulfuric acid solution forms said nascent hydrogen.

10. The method of claim 1 wherein said active hydrogen is generated with hydrogen gas in the presence of a catalyst.

11. A method of regenerating spent extractant comprising the steps of
    a) providing an organic solution containing compound II, said compound II having been formed by oxidation and sulfur-sulfur bonding of two dithiophosphinic extractant molecules,
    b) generating active hydrogen for use with said compound II,
    c) breaking said sulfur-sulfur bonds of said compound II with said active hydrogen to form dithiophosphinic acid, and
    d) recycling said dithiophosphinic acid to a solvent extraction circuit.

12. The method of claim 11 wherein said generating of said active hydrogen includes providing a reactive metal in a liquid mixture of acidic aqueous solution and said organic solution to react said reactive metal with said acidic aqueous solution of said liquid mixture to form nascent hydrogen.

13. The method of claim 12 including the additional step of mixing said reactive metal in said liquid mixture; and wherein said reactive metal is selected from the group consisting of iron, nickel and zinc.

14. The method of claim 13 wherein said reactive metal dissolves in a mineral acid to form said nascent hydrogen.

15. The method of claim 14 wherein said liquid mixture is maintained at a temperature of at least about 40° C. and a pH below at least about 3.

16. The method of claim 13 wherein dissolution of zinc metal in sulfuric acid solution forms said nascent hydrogen.

17. The method of claim 13 wherein dissolution of zinc metal in hydrochloric acid solution forms said nascent hydrogen.

18. The method of claim 13 wherein dissolution of nickel metal in hydrochloric acid solution forms said nascent hydrogen.

19. The method of claim 13 wherein dissolution of iron metal in sulfuric acid solution forms said nascent hydrogen.

20. The method of claim 11 wherein said active hydrogen is generated with hydrogen gas in the presence of a platinum group metal.

* * * * *